US012094703B1

(12) United States Patent
Huang et al.

(10) Patent No.: US 12,094,703 B1
(45) Date of Patent: Sep. 17, 2024

(54) SINGLE-SIDE STOPPING AND VIBRATION ABSORBING LAMP SLEEVE AND ELECTRODELESS LAMP ILLUMINATION DEVICE USING THE SAME

(71) Applicant: KANAUE APPLIED MATERIALS CORP., Tainan (TW)

(72) Inventors: Wei-Ming Huang, Tainan (TW); Ming Yuan Hu, Tainan (TW); Tse Tsao Chang, Tainan (TW)

(73) Assignee: KANAUE APPLIED MATERIALS CORP., Tainan (TW)

( * ) Notice: Subject to any disclaimer, the term of this patent is extended or adjusted under 35 U.S.C. 154(b) by 0 days.

(21) Appl. No.: 18/603,468

(22) Filed: Mar. 13, 2024

(30) Foreign Application Priority Data

Mar. 24, 2023 (TW) ................................ 112202729
Aug. 1, 2023 (TW) ................................ 112208125
Aug. 1, 2023 (TW) ................................ 112208126

(51) Int. Cl.
*H01J 65/04* (2006.01)

(52) U.S. Cl.
CPC .................................. *H01J 65/044* (2013.01)

(58) Field of Classification Search
CPC .................................................... H01J 65/044
See application file for complete search history.

(56) References Cited

U.S. PATENT DOCUMENTS

2009/0134805 A1* 5/2009 Ogasawara ........... H01J 65/048 315/246
2010/0171436 A1* 7/2010 DeVincentis ......... H01J 65/044 315/248

* cited by examiner

*Primary Examiner* — Anne M Hines
(74) *Attorney, Agent, or Firm* — Muncy, Geissler, Olds & Lowe, P.C.

(57) ABSTRACT

A single-side stopping and vibration absorbing lamp sleeve for fitting with an end part of an electrodeless lamp and being partially disposed in a mounting hole of a metal member includes: a large-diameter part; and a small-diameter part coaxially connected to the large-diameter part, wherein a through hole is formed in the large-diameter part and the small-diameter part, the end part fits with the through hole, an aperture of the through hole ranges between 2.9 mm and 3.1 mm, and an outer diameter of the small-diameter part ranges between 3.2 mm and 3.6 mm. Thus, it is possible to optimize mounting and working states of the lamp sleeves, decrease the vibration, movement and rotation generated when the electrodeless lamp is operating, and increase the service lifetime of the electrodeless lamp. An electrodeless lamp illumination device is also disclosed.

20 Claims, 10 Drawing Sheets

SINGLE-SIDE STOPPING AND VIBRATION ABSORBING LAMP SLEEVE AND ELECTRODELESS LAMP ILLUMINATION DEVICE USING THE SAME

CROSS-REFERENCE TO RELATED APPLICATIONS

This application claims priorities of No. 112202729 filed in Taiwan R.O.C. on Mar. 24, 2023 and Nos. 112208125 and 112208126 both filed in Taiwan R.O.C. on Aug. 1, 2023 under 35 USC 119, the entire contents of which are hereby incorporated by reference.

FIELD OF THE INVENTION

This disclosure relates to a lamp sleeve and an electrodeless lamp illumination device using the same, and more particularly to a single-side stopping and vibration absorbing lamp sleeve having a buffer characteristic and an electrodeless lamp illumination device using such the lamp sleeve.

DESCRIPTION OF RELATED ART

Today's illumination technology is progressing day by day and developed from the conventional ordinary incandescent light bulb and energy-saving light bulb to the light-emitting diode and the electrodeless lamp, so that the brightness is constantly increased, the consumed energy is decreased, and the generated heat is decreased.

The electrodeless lamp (or induction light) has no electrode and no filament, and mainly emits light using a magnetic ring to generate electromagnetic waves to excite substances in the lamp. For example, the mixture of mercury vapor and rare gas is filled into the low-pressure gas electrodeless lamp. Upon operating, mercury atoms are ionized and excited to release ultra-violet rays to irradiate fluorescent substances on the wall of the lamp tube, and the fluorescent substances output visible light. Because no filament and no electrode are provided, the lamp can be made to have various shapes, and have the service lifetime approaching 100,000 hours, so that the electrodeless lamp becomes gradually favored.

However, because no electrode is present, the electrodeless lamp is typically directly mounted on metal members of a lamp holder. In a conventional example, the metal members are formed with through holes, and lamp posts on two ends of the electrodeless lamp are inserted into the through holes. In this case, the electrodeless lamp tends to rotate or vibrate due to the oscillation effect when the electrodeless lamp is working because the electrodeless lamp emits light using the oscillating microwaves, and loose gaps are kept between the lamp posts and the metal members to achieve loose fitting. When the electrodeless lamp rotates or vibrates, mutual friction/collision tends to occur between the lamp post and the metal member, and the lamp tends to become damaged.

SUMMARY OF THE INVENTION

It is therefore an objective of this disclosure to provide a single-side stopping and vibration absorbing lamp sleeve and an electrodeless lamp illumination device using the same to decrease vibration, movement and rotation generated when the electrodeless lamp is operating, and to increase the service lifetime of the electrodeless lamp.

To achieve the above-identified objective, this disclosure provides a single-side stopping and vibration absorbing lamp sleeve for fitting with an end part of an electrodeless lamp and being partially disposed in a mounting hole of a metal member. The lamp sleeve includes: a large-diameter part; and a small-diameter part coaxially connected to the large-diameter part. A through hole is formed in the large-diameter part and the small-diameter part, the end part fits with the through hole, an aperture of the through hole ranges between 2.9 mm and 3.1 mm, and an outer diameter of the small-diameter part ranges between 3.2 mm and 3.6 mm.

This disclosure also provides an electrodeless lamp illumination device including: a first lamp sleeve and a second lamp sleeve each being the single-side stopping and vibration absorbing lamp sleeve; and the electrodeless lamp having a light-emitting part and a second end part connected to the end part of the light-emitting part, the end part being defined as a first end part, wherein the first end part fits with the through hole of the first lamp sleeve, and the second end part fits with the through hole of the second lamp sleeve.

According to the above-mentioned aspect, the single-side stopping and vibration absorbing lamp sleeve may further include a bottom part. The bottom part seals one end of the small-diameter part away from the large-diameter part.

According to the above-mentioned aspects, the small-diameter part has an outer peripheral surface, which is conical.

With the above-mentioned aspects, no direct contact is present between the electrodeless lamp and the mounting holes of the original metal members, and the lamp sleeves are used to mount the lamp posts of the lamp to decrease the condition that the lamp is damaged by the rotation (vibration) generated upon usage. In addition, the mounting accuracy and consistency can be further increased to avoid any difference caused by different operators. Furthermore, the conical buffer characteristic can further keep the substantially horizontal state of the electrodeless lamp, maintain the stability of the lamp source, and prevent the two lamp sleeves from having the nonuniform wear.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
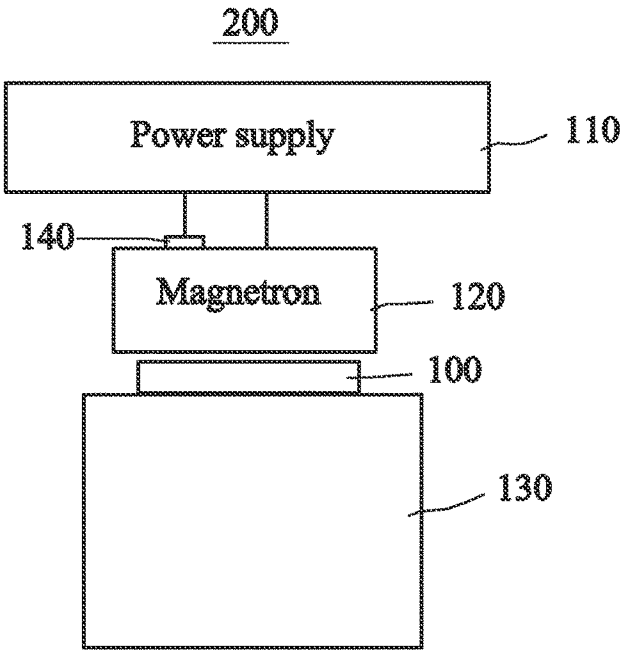
FIG. 1 is a schematic view showing an electrodeless lamp illumination system according to a preferred embodiment of this disclosure.

FIG. 1 is a schematic view showing an electrodeless lamp illumination system according to the preferred embodiment of this disclosure. Referring to FIG. 1, an electrodeless lamp illumination system 200 includes a power supply 110, a magnetron 120, an electrodeless lamp illumination device 100 and an object placement region 130. The power supply 110 is electrically connected to the magnetron 120, and provides power to turn on the magnetron 120 to generate oscillating microwaves, and the electrodeless lamp illumination device 100 is lighted up using the oscillating microwaves to excite substances in the lamp to illuminate a to-be-inspected object (not shown) in the object placement region 130. An image acquiring device or sensor (not shown) in the object placement region 130 can be used to obtain data of the to-be-inspected object, and a power detector 140 is used to monitor whether the electrodeless lamp illumination device 100 operates normally. Although the electrodeless lamp illumination device 100 of this embodiment is located under the magnetron 120, the electrodeless lamp illumination device 100 in another example can be disposed in the magnetron 120.

Figure 2:
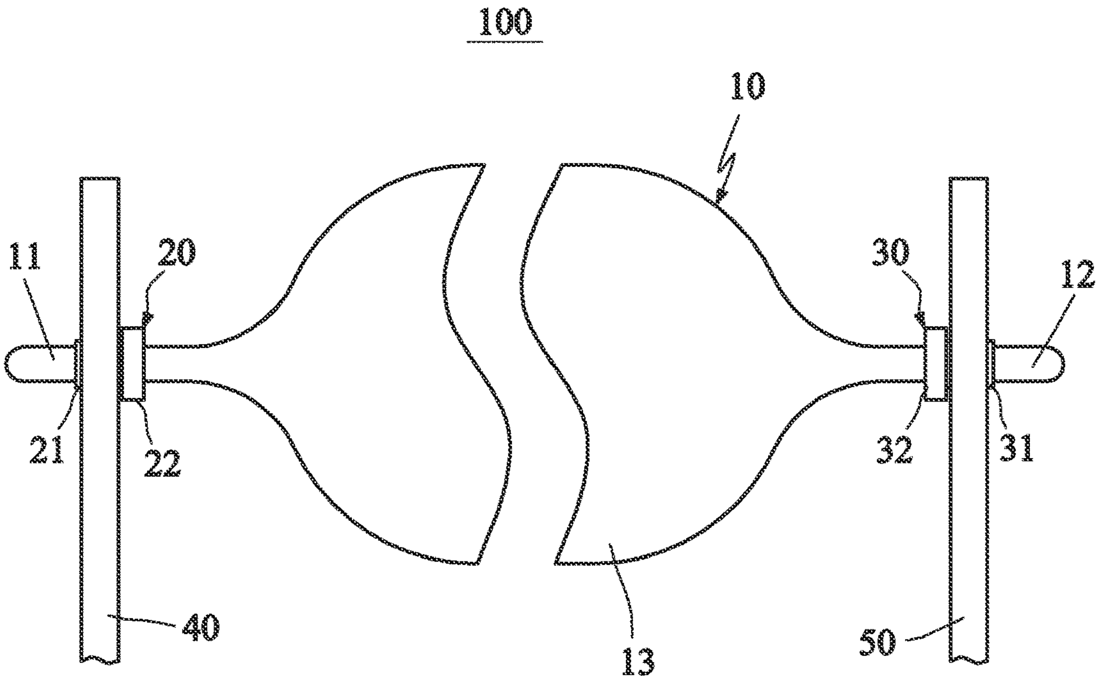
FIG. 2 is a partial front view showing an electrodeless lamp illumination device of FIG. 1.
Figure 3:
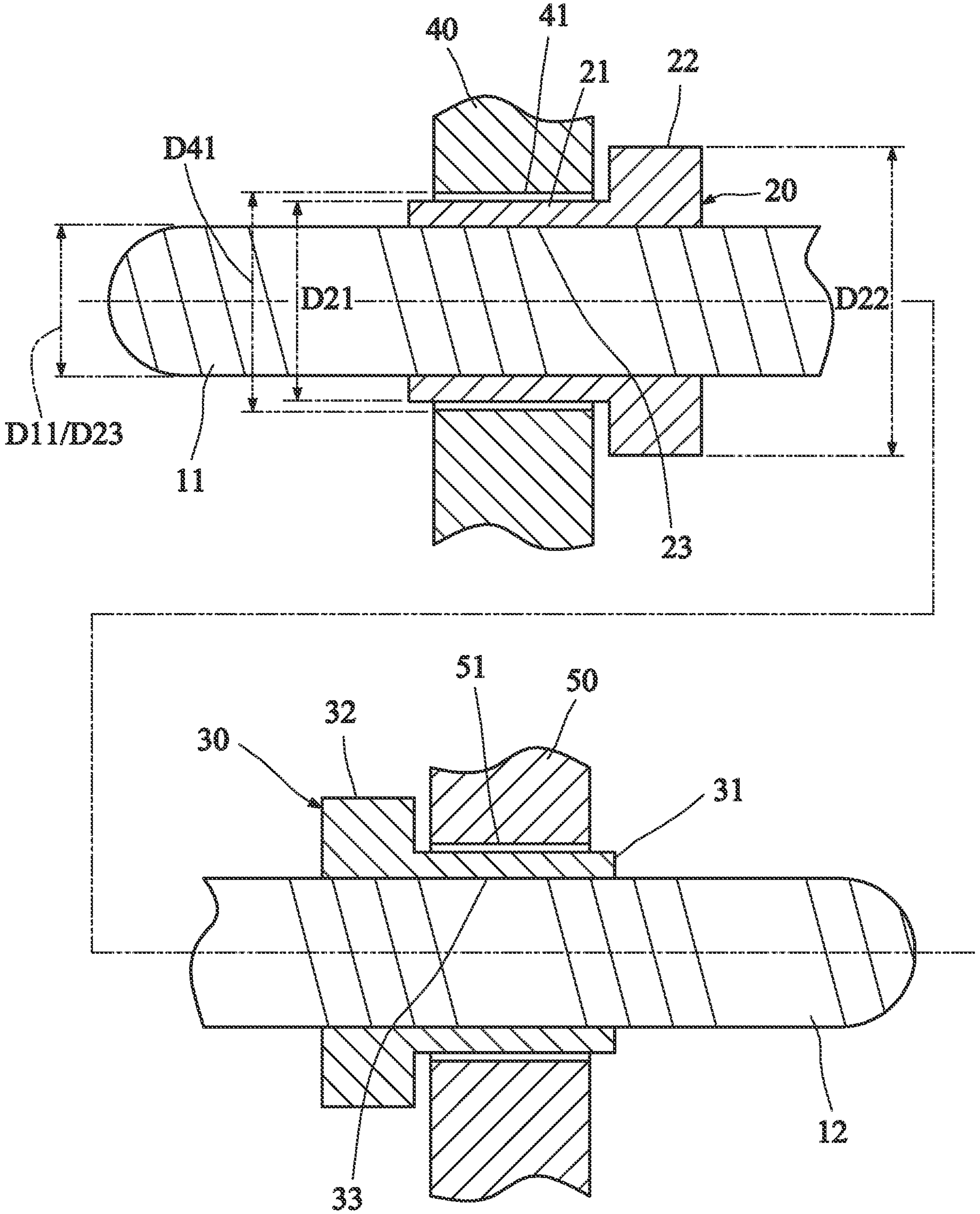
FIG. 3 is a partial cross-sectional view showing the electrodeless lamp illumination device of FIG. 2.

FIG. 2 is a partial front view showing the electrodeless lamp illumination device of FIG. 1. FIG. 3 is a partial cross-sectional view showing the electrodeless lamp illumination device of FIG. 2. Referring to FIGS. 2 and 3, the electrodeless lamp illumination device 100 includes an electrodeless lamp 10, a first lamp sleeve 20 and a second lamp sleeve 30.

The electrodeless lamp 10 has a light-emitting part 13 and a first end part 11 and a second end part 12 connected to the light-emitting part 13. The first end part 11 and the second end part 12 may be referred to as lamp posts of the electrodeless lamp. The light-emitting part 13 receives oscillating microwaves from the magnetron 120 and emits light.

The first lamp sleeve 20 has a first small-diameter part 21 and a first large-diameter part 22 coaxially connected together, and a through hole 23 is formed in the first large-diameter part 22 and the first small-diameter part 21. In this example, the through hole 23 penetrates through the first small-diameter part 21 and the first large-diameter part 22. The first end part 11 passes through the through hole 23, and a diameter of the first small-diameter part 21 is smaller than a diameter of the first large-diameter part 22.

The second lamp sleeve 30 and the first lamp sleeve 20 have the same structure. Some characteristics will be described with reference to the first lamp sleeve 20 only. These characteristics are also applicable to the second lamp sleeve 30. The second lamp sleeve 30 has a second small-diameter part 31 and a second large-diameter part 32 connected together. A through hole 33 is formed in the second small-diameter part 31 and the second large-diameter part 32. The second end part 12 passes through the through hole 33.

The electrodeless lamp illumination device 100 having the above-mentioned elements (the electrodeless lamp 10, the first lamp sleeve 20 and the second lamp sleeve 30) may be sold as a single product. The first end part 11 and the second end part 12 may be respectively directly mounted to or detachably fit with the through holes 23 and 33. When multiple electrodeless lamps 10 are packed, the first lamp sleeve 20 and the second lamp sleeve 30 as well as a base matching with the first lamp sleeve 20 and the second lamp sleeve 30 may be used to position and protect the electrodeless lamp 10.

Optionally, the electrodeless lamp illumination device 100 further includes a first metal member 40 and a second metal member 50, which are two opposite members, for mounting the electrodeless lamp illumination device 100. The first small-diameter part 21 passes through a mounting hole 41 of the first metal member 40, and the second small-diameter part 31 passes through a mounting hole 51 of the second metal member 50, so that the first small-diameter part 21 is disposed between the first end part 11 and the first metal member 40, and that the second small-diameter part 31 is disposed between the second end part 12 and the first metal member 40. Thus, the first lamp sleeve 20 and the second lamp sleeve 30 can be used to mount the electrodeless lamp 10 in a dual-axial manner, to decrease the degree of freedom of vibration or movement, and thus to provide the buffer characteristic. On the other hand, the wear is designed on the lamp sleeves, so that the wear between the metal members and the electrodeless lamp can be reduced, and only the lamp sleeves need to be replaced for maintenance. In addition, the first metal member 40 and the second metal member 50 have the appropriate elasticity, so that the metal members can be properly moved when the electrodeless lamp 10 is being mounted.

Because the electrodeless lamp 10 is mounted between the first metal member 40 and the second metal member 50 through the first lamp sleeve 20 and the second lamp sleeve 30, the first lamp sleeve 20 and the second lamp sleeve 30 have the isolation effect. So, the first lamp sleeve 20 and the second lamp sleeve 30 are made by the heat-resistant and non-metallic buffer material. In one example, the lamp sleeve has a one-piece structure, and may be made of a material including polytetrafluoroethylene (PTFE), which is also referred to as a Teflon material having the good heat resistance (up to 300° C.), the good stability of the finished product after processing (cannot easily deform), the proper elasticity of the finished product, the self-lubricating property, the stable plastic molecules (cannot easily deteriorate), the low cost and the like. The buffer material also can provide the vibration proof effect. Because the first large-diameter part 22 and the second large-diameter part 32 are disposed between the first small-diameter part 21 and the second small-diameter part 31, and certain friction is present between the lamp sleeve and the electrodeless lamp, the lamp sleeve can fasten the electrodeless lamp 10, so that the position of the electrodeless lamp 10 can be limited and the electrodeless lamp cannot move significantly rightward and leftward when the vibration is generated. In addition, in order to avoid the vibration, the first lamp sleeve 20 and the second lamp sleeve 30 may be designed to have the hardness smaller than the hardness of the first end part 11 and the second end part 12, and preferably have slight elasticity to absorb the vibration and provide buffer effects. Thus, the risk that the lamp post gets broken due to the vibration or rotation caused by the loose fitting between the lamp post and the mounting hole of the metal member in the environment of oscillating microwaves can be decreased.

In order to optimize the mounting and working states of the lamp sleeves, experiments have been performed to discover that the gap between the lamp sleeve and the metal member is preferably greater than or equal to 0.5 mm (more preferably greater than or equal to 0.6 mm) at the room temperature (25° C.) in order to facilitate installation or mounting. In this case, the operator can pass the lamp sleeve through the metal member rapidly, and the mounting speed of the electrodeless lamp can be increased. The prior art fails to provide the further research on the mounting speed. In addition, in order to reduce the vibration, the gap between the lamp sleeve and the metal member at the working temperature (200 to 250° C.) of the electrodeless lamp is preferably smaller than or equal to 1.15 mm (more preferably smaller than or equal to 1.25 mm) because the too-large gap cannot provide the effect of effectively reducing the vibration. In one example, when the diameter D41 of the mounting hole ranges between 4.2 mm and 4.5 mm and the outer diameter of the end part of the electrodeless lamp is equal to 3 mm, the aperture D23 of the through hole 23 ranges between 2.9 mm and 3.1 mm to provide the tolerance of +0.1 mm, so that the lamp sleeve can fit with the end part (having the outer diameter D11) of the electrodeless lamp. In order to satisfy the above-mentioned condition, a try and error method is adopted to determine the optimum outer diameter D21 of the first small-diameter part 21 as ranging between 3.2 mm and 3.6 mm, so that the gap at the room temperature ranges between 0.6 mm and 1.3 mm. In another example, the outer diameter D21 ranges between 3.3 mm and 3.5 mm to achieve the better vibration reduction and mounting effects. In still another example, the outer diameter D21 ranges between 3.35 mm and 3.45 mm to achieve the much better vibration reduction and mounting effects. In addition, PTFE and the iron material of the metal member have the expansion coefficients respectively equal to 11×10−5 and 12×10−6 (/° C.). At 200° C., the determined gap ranges between 0.55 mm and 1.25 mm. At 250° C., the determined gap ranges between 0.53 mm and 1.24 mm, and the above-mentioned requirement (>0.5 mm) is satisfied. In addition, after analysis and experiment, it is found that the outer diameter D22 of the first large-diameter part 22 ranges between 4.6 mm and 5.6 mm, and is greater than the diameter D41 to provide the stopping function. When the axial length of the first large-diameter part 22 is equal to about 1 mm, the outer diameter D22 is smaller than or equal to 6.0 mm. Because the outer diameter D22 greater than 6.0 mm will weaken the structure of the first large-diameter part 22, the damage rate during storage and shipping is increased. In one example, the outer diameter D22 is smaller than or equal to 5.8 mm, so that the structure of the first large-diameter part 22 is further strengthened. In one example, the outer diameter D22 is smaller than or equal to 5.6 mm, so that the structure of the first large-diameter part 22 is further strengthened.

In this embodiment, the first large-diameter part 22 is disposed outside the mounting hole 41, and stops the first metal member 40 to prevent the electrodeless lamp 10 from movement and rotation relative to the first metal member 40; and the second large-diameter part 32 is disposed outside the mounting hole 51, and stops the second metal member 50 to prevent the electrodeless lamp 10 from movement and rotation relative to the second metal member 50.

Optionally, when the light-emitting part 13 does not emit light for a predetermined time, the overall structure of the electrodeless lamp 10 is cooled down, a gap is present between the first large-diameter part 22 and the first metal member 40, and a gap is present between the second large-diameter part 32 and the second metal member 50 to facilitate the installation and replacement.

Optionally, when the light-emitting part 13 continuously emits light for another predetermined time, the overall structure of the electrodeless lamp 10 expands due to the temperature rise, and there is no gap present between the first large-diameter part 22 and the first metal member 40, and between the second large-diameter part 32 and the second metal member 50, so that the vibration and movement can be further reduced.

Figure 4:
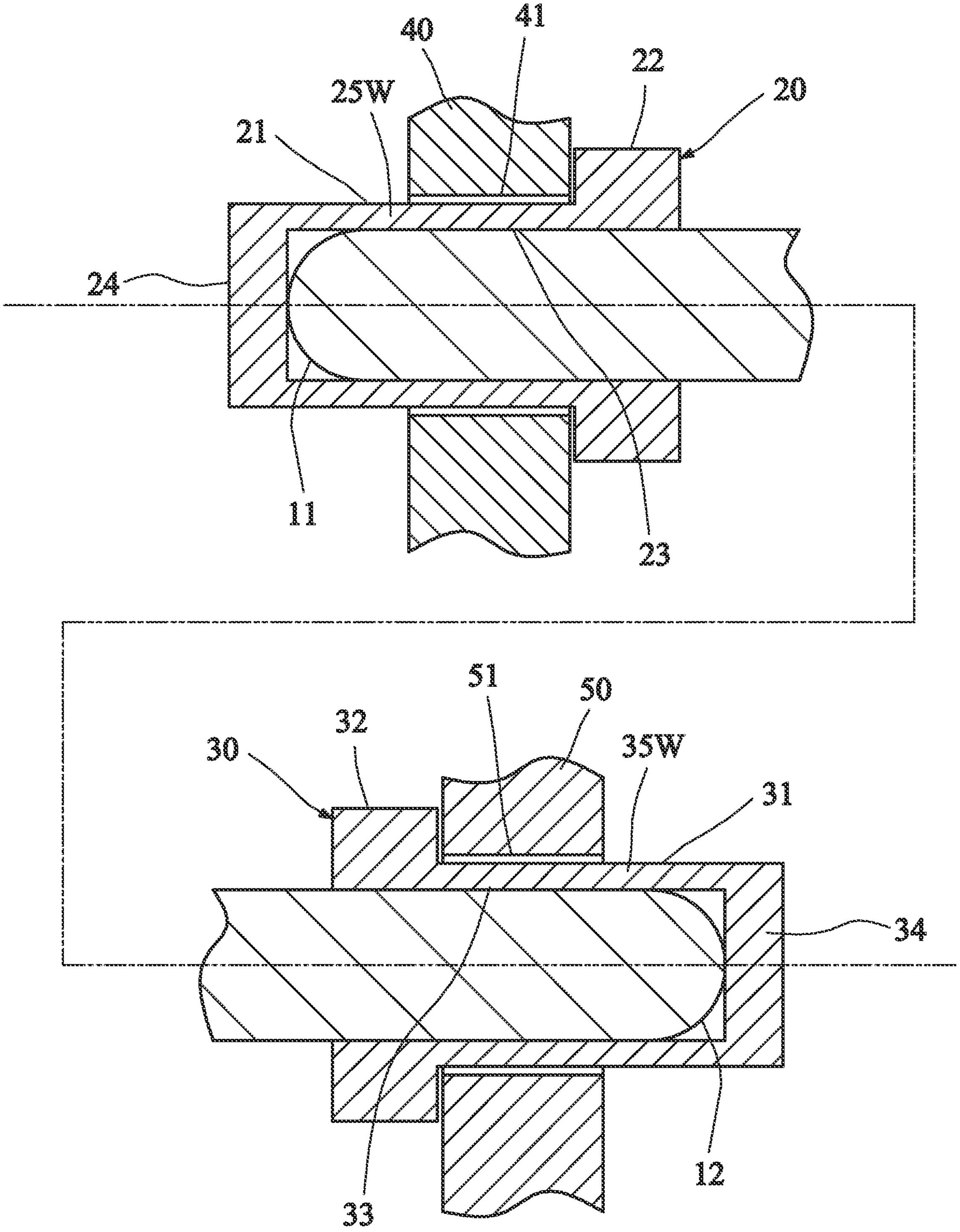
FIG. 4 is a partial cross-sectional view showing another example of the electrodeless lamp illumination device of FIG. 3.

FIG. 4 is a partial cross-sectional view showing another example of the electrodeless lamp illumination device of FIG. 3. Referring to FIG. 4, this example is similar to FIG. 3 except for the difference that the first lamp sleeve 20 further includes a bottom part 24. The bottom part 24 seals one end of the first small-diameter part 21 away from the first large-diameter part 22, so that the through hole 23 becomes a blind hole. Upon actual installation, a robot or an operator fits the first lamp sleeve 20 with the first end part 11 until the bottom part 24 of the first small-diameter part 21 touches the first end part 11, and fits the second lamp sleeve 30 with the second end part 12 until a bottom part 34 of the second small-diameter part 31 touches the second end part 12. However, it is understandable that the touched relationship may become the slightly detached condition in the transportation or working period due to vibration. In one example, the thickness of the bottom part 24 of the first small-diameter part 21 is greater than the thickness of a circumferential wall 25W of the first small-diameter part 21, and the thickness of the bottom part 34 of the second small-diameter part 31 is greater than the thickness of a circumferential wall 35W of the second small-diameter part 31. Therefore, the thicker structure of the bottom part provides the installation stopping and positioning functions, and different operators can install the lamp sleeve to the correct position. In addition, the lamp sleeve completely covers the first end part and the second end part to prevent the electrodeless lamp from becoming broken due to the collision with the end part upon transportation.

The first lamp sleeve 20 and the second lamp sleeve 30 are configured to completely or entirely cover the first end part 11 and the second end part 12, respectively, so that two end parts of the electrodeless lamp 10 are mounted between the first metal member 40 and the second metal member 50 to form two buffer end parts. At this time, each buffer end part has no step (the outer diameter thereof has no sudden decrease), so the electrodeless lamp cannot be skewed and can be kept stable in the working period.

Figure 5:
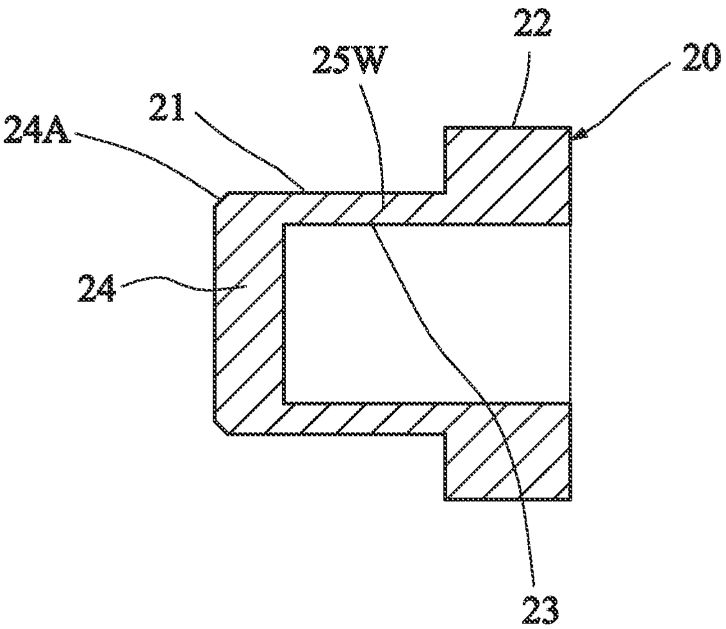
FIG. 5 is a cross-sectional view showing a modified example of a first lamp sleeve of FIG. 4.

FIG. 5 is a cross-sectional view showing a modified example of the first lamp sleeve of FIG. 4. Referring to FIG. 5, the bottom part 24 has an outer chamfer part 24A to avoid the stress concentration at the right angle part and facilitate the installation of the first small-diameter part 21.

Figure 6:
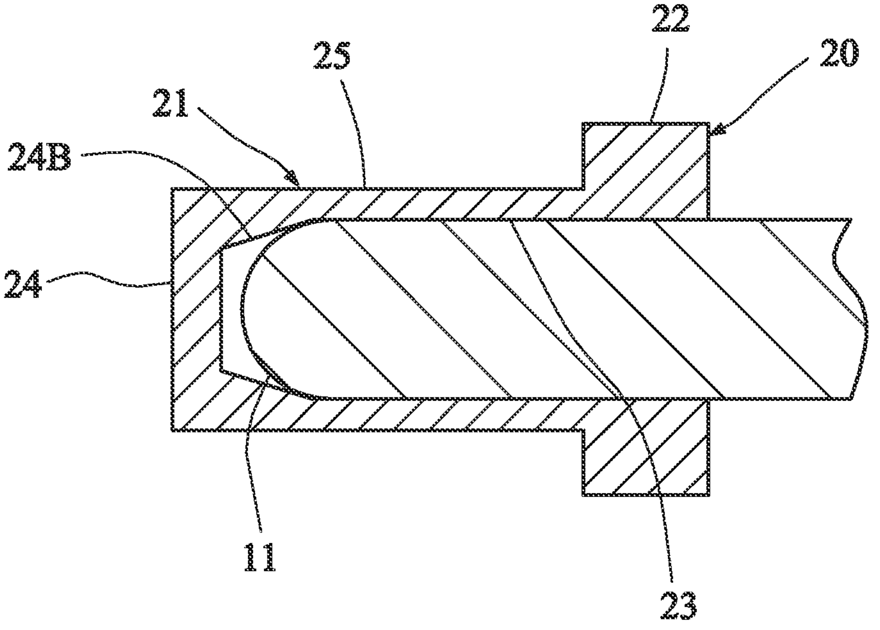
FIGS. 6 and 7 are cross-sectional views showing applications of the modified example of the first lamp sleeve of FIG. 4.
Figure 7:
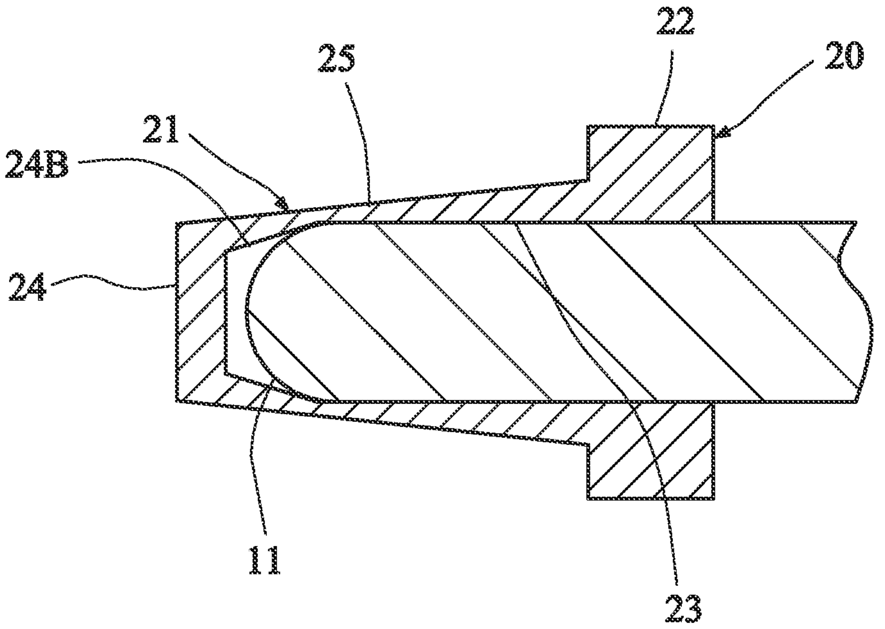

FIGS. 6 and 7 are cross-sectional views showing applications of the modified example of the first lamp sleeve of FIG. 4. Referring to FIG. 6, the bottom part 24 has an inner chamfer part 24B, so that the through hole 23 becomes a conical blind hole. Consequently, the first end part 11 can be tightly fit with the conical blind hole to achieve a further positioning effect. In this case, the bottom part 24 is separated from the first end part 11. In another example, however, the first bottom part may also be in direct contact with the first end part. It is understandable that the conical blind hole may be a local or global structure to adaptively match with the external shape of the first end part 11. Referring to FIG. 7, this modified example is similar to FIG. 4 except for the difference that the first small-diameter part 21 has a conical outer wall (outer peripheral surface 25), so that the first small-diameter part 21 is tapered in a direction from the first large-diameter part 22 to the first small-diameter part 21. It is understandable that the second small-diameter part may also have the conical outer wall. Consequently, the conical outer walls of the first small-diameter part and the second small-diameter part can work in conjunction with the mounting hole 41 (FIG. 4) and the mounting hole 51 (FIG. 4), so that the electrodeless lamp 10 has the auto-centering effect under gravity and vibration. It is understandable that the conical outer wall and the conical blind hole need not to be present concurrently, and may also be present individually.

Figure 8:
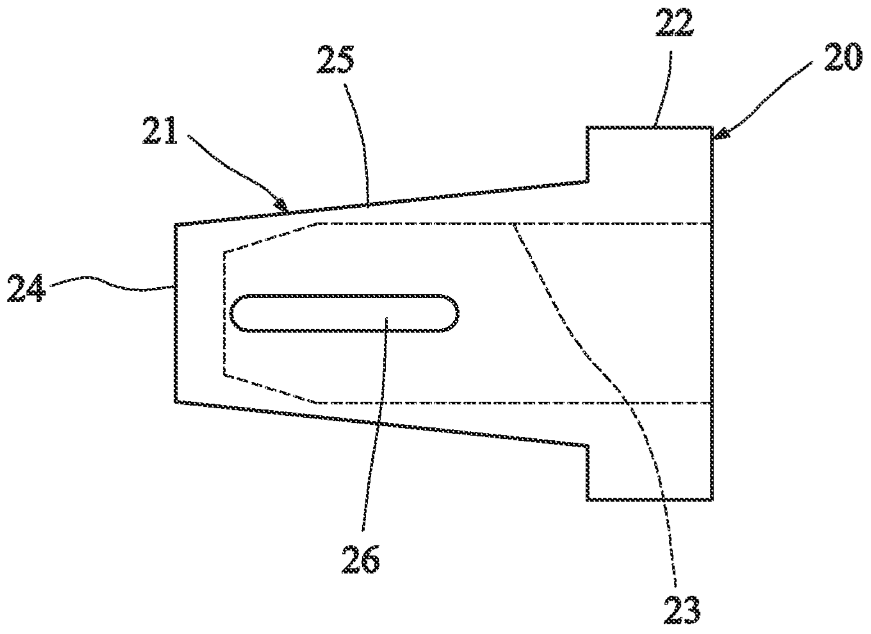
FIGS. 8 to 11 are side views showing modified examples of the first lamp sleeve of FIG. 4.
Figure 9:
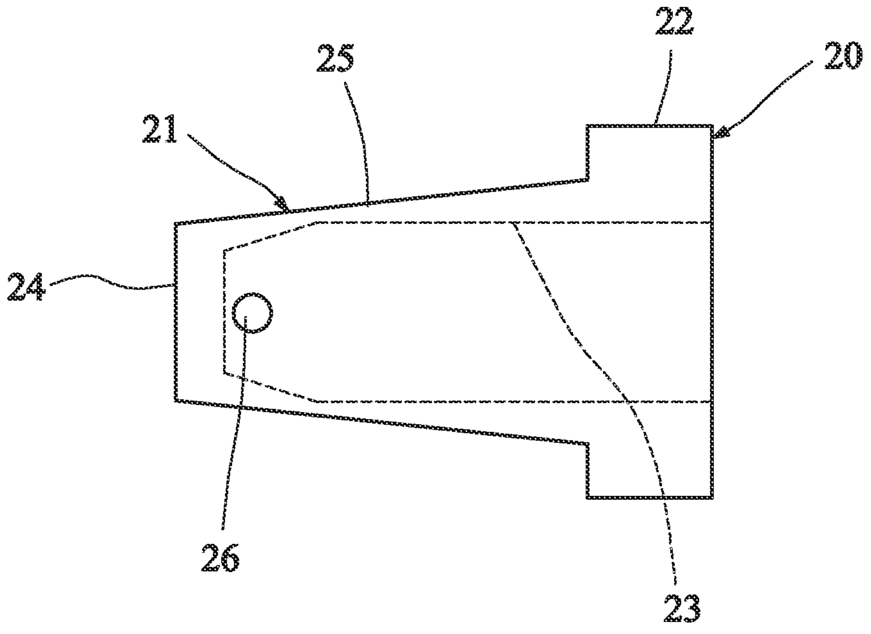
Figure 10:
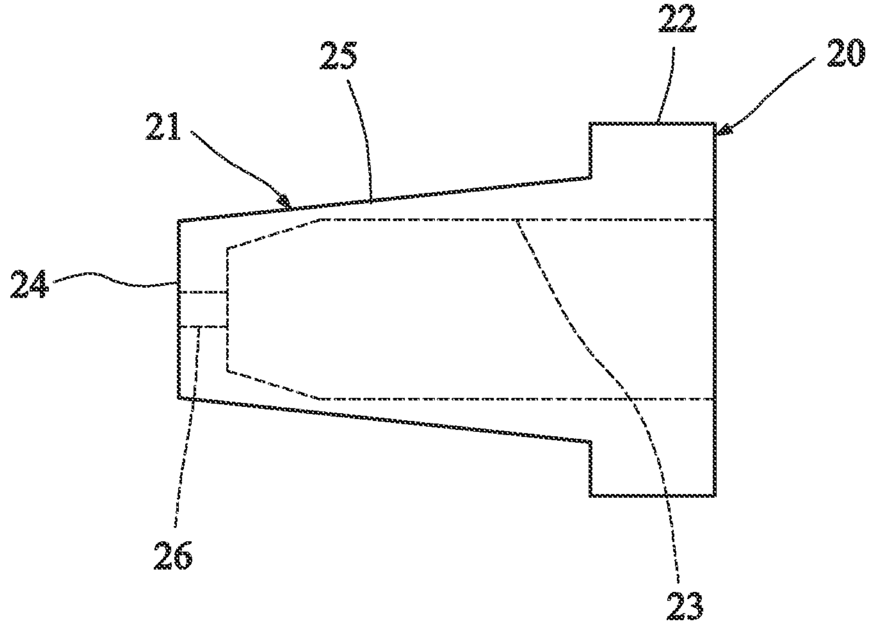
Figure 11:
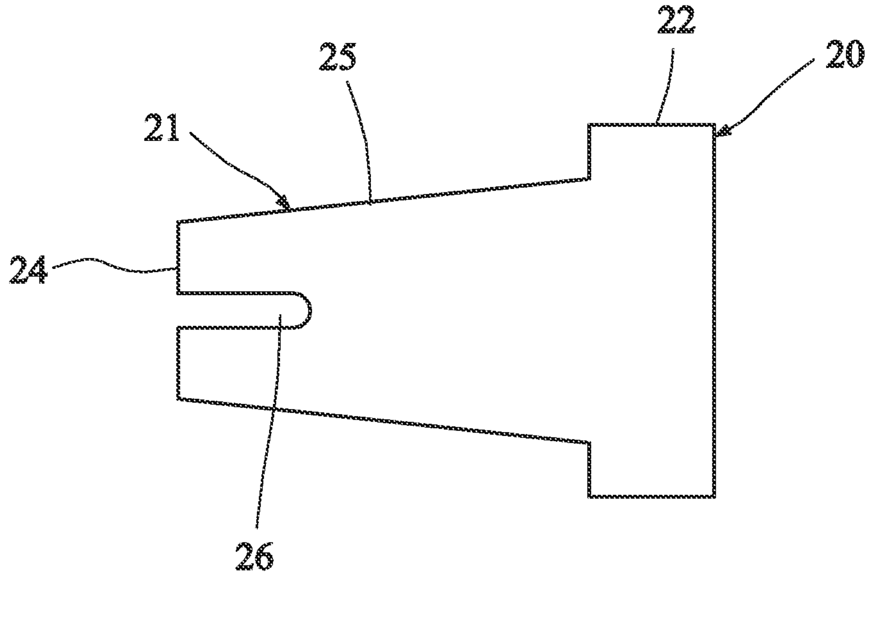

FIGS. 8 to 11 are side views showing modified examples of the first lamp sleeve of FIG. 4. Referring to FIGS. 8 to 11, these examples are similar to FIG. 4 except for the difference that the first small-diameter part 21 of the first lamp sleeve 20 has at least one opening 26 connected with the through hole 23. That is, the opening 26 is formed on the outer peripheral surface 25 (may be the conical outer wall (FIG. 7) or the cylindrical outer wall (FIG. 6)) of the through hole 23. The opening includes, without limitation to, a circular hole, an elliptic hole, a rectangular hole or any other shaped hole. In the example of FIG. 8, the opening 26 is a groove. The longitudinal direction of the groove may be an axial direction, but may also be an inclined direction, and no restriction is made thereto. Thus, the first small-diameter part 21 has the deformation elasticity, so that air in the first lamp sleeve 20 can be exhausted when the first lamp sleeve 20 tightly fits with the first end part to avoid the condition that the first lamp sleeve 20 cannot be installed to the predetermined position. Similarly, the second small-diameter part may have at least one opening, and detailed descriptions thereof will be omitted. In the example of FIG. 9, the opening 26 is a circular hole that can be easily formed on the outer peripheral surface 25. In the example of FIG. 10, the opening 26 is a circular hole that can be easily formed on the bottom part 24. If the opening 26 is formed at the center of the bottom part 24, then the deflation becomes more uniform. It is understandable that the opening may also be formed on the distal end or front section of the first small-diameter part, or the bottom part of the small-diameter part. In the example of FIG. 11, the opening 26 penetrates through the bottom part 24 and the outer peripheral surface 25 of the first small-diameter part 21. With this structure, cutting can be performed in the direction from the bottom part 24 of the first small-diameter part 21 to the first large-diameter part 22 upon processing to form the opening 26, and the opening 26 has the abilities of deflation and slight deformation in multiple directions to adapt to the assembling and manufacturing tolerances of the electrodeless lamp.

Figure 12:
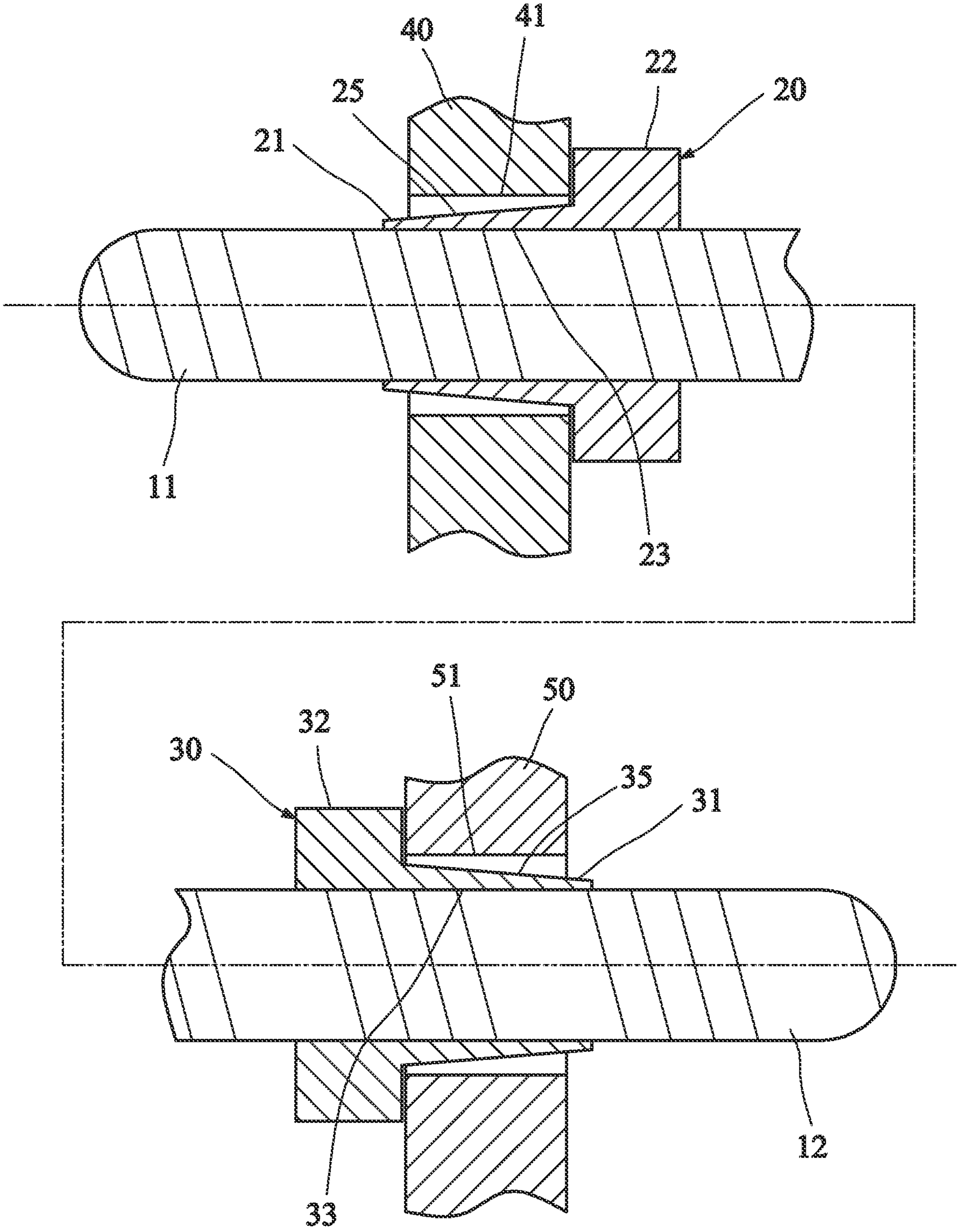
FIG. 12 is a partial cross-sectional view showing still another example of the electrodeless lamp illumination device of FIG. 3.
Figure 13:
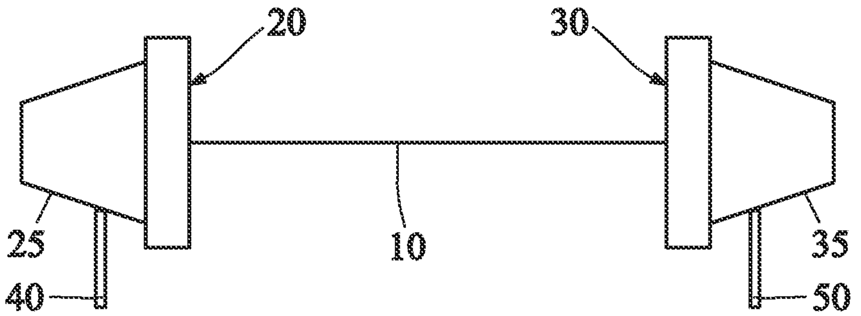
FIGS. 13 and 14 are schematic views showing two states of the electrodeless lamp illumination device of FIG. 12.
Figure 14:
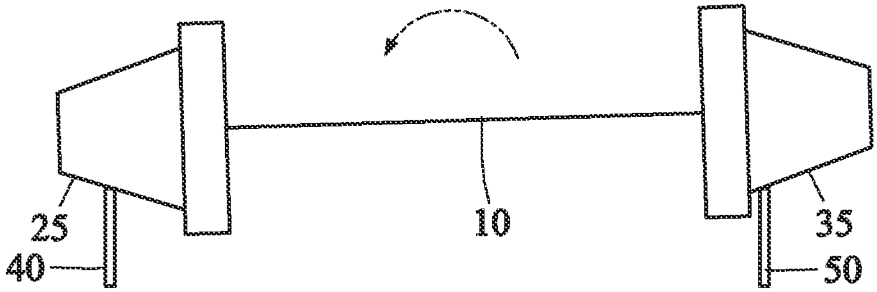

FIG. 12 is a partial cross-sectional view showing still another example of the electrodeless lamp illumination device of FIG. 3. Referring to FIG. 12, the lamp sleeve has a conical buffer characteristic, the outer peripheral surface 25 of the first small-diameter part 21 is conical, and the first small-diameter part 21 is tapered in a direction from the first large-diameter part 22 to the first small-diameter part 21. FIGS. 13 and 14 are schematic views showing two states of the electrodeless lamp illumination device of FIG. 12. Referring to FIG. 13 in the normal installation condition, the first conical outer peripheral surface 25 is in contact with the first metal member 40, and a conical outer peripheral surface 35 is in contact with the second metal member 50, so that the overall electrodeless lamp 10 is held in the substantially horizontal state. Referring to FIG. 14, when vibration is caused by the manufacturing tolerance and the electrodeless lamp 10 moves rightward, the overall electrodeless lamp 10 is tilted or skewed due to the constant distance between the first metal member 40 and the second metal member 50. However, the overall electrodeless lamp 10 automatically returns to the substantially horizontal state of FIG. 13 due to the gravity and the taper of each of the outer peripheral surfaces 25 and 35. Thus, the effect of automatically returning to the substantially horizontal state of FIG. 13 is provided to avoid the single-side lamp sleeve from abnormal wear.

Figure 15:
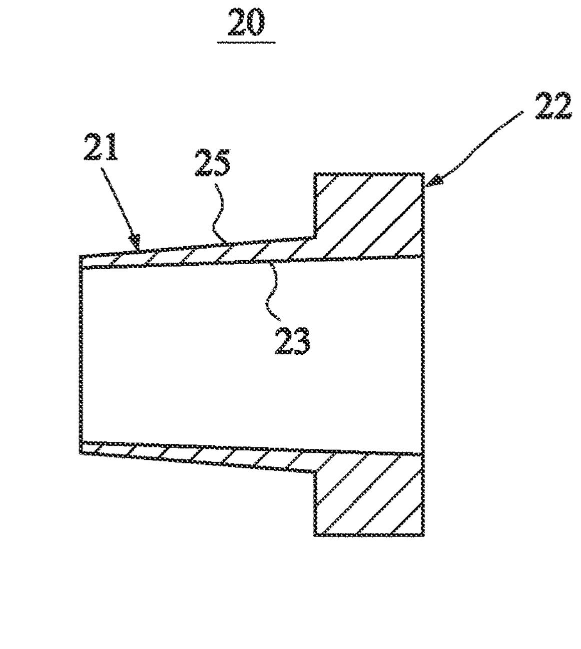
FIG. 15 is a cross-sectional view showing an application of a modified example of the first lamp sleeve of FIG. 12.

FIG. 15 is a cross-sectional view showing an application of a modified example of the first lamp sleeve of FIG. 12. Referring to FIG. 15, this example is similar to FIG. 12 except for the difference that the through hole 23 is a conical through hole. In this example, the slope of the circumferential surface of the through hole 23 is smaller than the slope of the outer peripheral surface 25. Because the housing of the electrodeless lamp 10 is made of glass, the two end parts may be sloped due to the manufacturing tolerance. Thus, the conical through hole can be adapted to the conical end part, so that the first end part can be tightly fit with the conical through hole to further achieve the positioning effect. The above-mentioned structure may also provide the gradually thinned tube wall using the first small-diameter part and thus the flexibility, so that the first lamp sleeve can be fit with the first end part as possible as it can. It is understandable that the outer conical surface and the conical through hole need not to be present concurrently, and may also be present individually. In another example, the slope of the circumferential surface of the through hole is equal to the slope of the outer peripheral surface. Thus, the tube wall with the uniform thickness can be provided using the small-diameter part to facilitate the manufacturing process.

Figure 16:
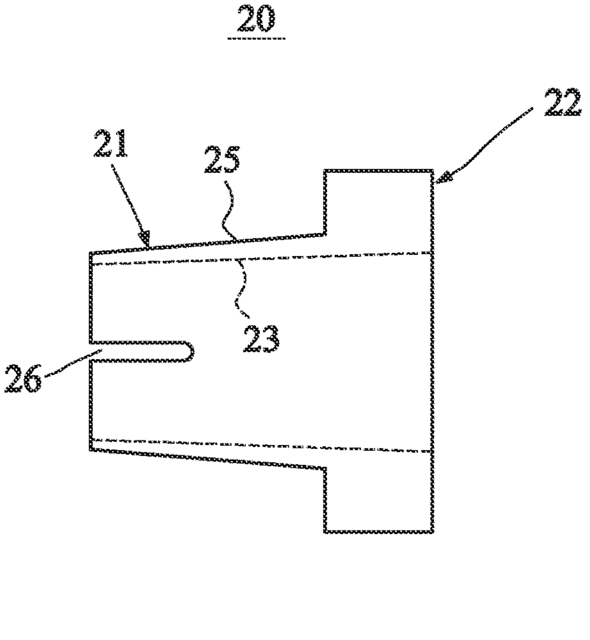
FIG. 16 is a side view showing a modified example of the first lamp sleeve of FIG. 15.

FIG. 16 is a side view showing a modified example of the first lamp sleeve of FIG. 15. Referring to FIG. 16, this example is similar to FIG. 5 except for the difference that the first small-diameter part 21 of the first lamp sleeve 20 has one or multiple grooves (or slots) 26, which are connected with the through hole 23, and thus formed on the conical wall of the through hole 23, so that the distal end of the first small-diameter part 21 has the claw shaped structure. The longitudinal direction of the groove 26 may be axial, may also be inclined, and the example is not restricted thereto. Thus, the distal end of the first small-diameter part 21 has the deformation elasticity, and may tightly clamp the first end part of the electrodeless lamp using pre-load or a girdle to avoid detachment. In another example, a sheet may be inserted between the first small-diameter part 21 and the first end part, so the distal end of the first small-diameter part 21 expands to tightly fit with the mounting hole of the first metal member to avoid detachment also. Similarly, the second small-diameter part may also have one or multiple grooves, and detailed descriptions thereof will be omitted. It is understandable that the groove may also be formed at the middle section of the first small-diameter part without extending to the distal end.

With the lamp sleeve structure of this disclosure, the lamp sleeves are added to the lamp post parts of the electrodeless lamp without modifying the original apparatus structure, so that there is no direct contact present between the lamp posts and the mounting holes of the original metal members. In addition, the lamp sleeves are used to mount the lamp posts of the lamp to decrease the condition that the lamp is damaged by the rotation (vibration) generated upon usage. Also, the mounting accuracy and consistency can be further increased, and there is no error caused by different operators, so that the operational difference between different devices cannot be generated. In addition, the conical buffer characteristic can further keep the substantially horizontal state of the electrodeless lamp, maintain the stability of the lamp source, and prevent the two lamp sleeves from having the nonuniform wear.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

The invention claimed is:

1. A single-side stopping and vibration absorbing lamp sleeve for fitting with an end part of an electrodeless lamp and being partially disposed in a mounting hole of a metal member, the single-side stopping and vibration absorbing lamp sleeve comprising:

a large-diameter part; and a small-diameter part coaxially connected to the large-diameter part, wherein a through hole is formed in the large-diameter part and the small-diameter part, the end part fits with the through hole, an aperture of the through hole ranges between 2.9 mm and 3.1 mm, and an outer diameter of the small-diameter part ranges between 3.2 mm and 3.6 mm.

2. The single-side stopping and vibration absorbing lamp sleeve according to claim 1, wherein the outer diameter of the small-diameter part ranges between 3.3 mm and 3.5 mm.

3. The single-side stopping and vibration absorbing lamp sleeve according to claim 1, wherein the outer diameter of the small-diameter part ranges between 3.35 mm and 3.45 mm.

4. The single-side stopping and vibration absorbing lamp sleeve according to claim 1, wherein a material of the single-side stopping and vibration absorbing lamp sleeve comprises polytetrafluoroethylene, and an outer diameter of the large-diameter part ranges between 4.6 mm and 6.0 mm.

5. The single-side stopping and vibration absorbing lamp sleeve according to claim 1, further comprising a bottom part sealing one end of the small-diameter part away from the large-diameter part.

6. The single-side stopping and vibration absorbing lamp sleeve according to claim 5, wherein the bottom part has a chamfer part.

7. The single-side stopping and vibration absorbing lamp sleeve according to claim 5, wherein the small-diameter part is tapered in a direction from the large-diameter part to the small-diameter part.

8. The single-side stopping and vibration absorbing lamp sleeve according to claim 5, wherein the small-diameter part has at least one opening connecting with the through hole.

9. The single-side stopping and vibration absorbing lamp sleeve according to claim 8, wherein the at least one opening penetrates through the bottom part and an outer peripheral surface of the small-diameter part.

10. The single-side stopping and vibration absorbing lamp sleeve according to claim 1, wherein the small-diameter part has an outer peripheral surface, which is conical.

11. The single-side stopping and vibration absorbing lamp sleeve according to claim 10, wherein a slope of a circumferential surface of the through hole is smaller than a slope of the outer peripheral surface.

12. The single-side stopping and vibration absorbing lamp sleeve according to claim 1, wherein the small-diameter part has at least one opening connecting with the through hole.

13. An electrodeless lamp illumination device, comprising:

a first lamp sleeve and a second lamp sleeve each being the single-side stopping and vibration absorbing lamp sleeve according to claim 1; and the electrodeless lamp having a light-emitting part and a second end part connected to the end part of the light-emitting part, the end part being defined as a first end part, wherein the first end part fits with the through hole of the first lamp sleeve, and the second end part fits with the through hole of the second lamp sleeve.

14. The electrodeless lamp illumination device according to claim 13, further comprising two opposite members each being the metal member, wherein the two opposite members are respectively defined as a first metal member and a second metal member, wherein the small-diameter part of the first lamp sleeve passes through the mounting hole of the first metal member, and the small-diameter part of the second lamp sleeve passes through the mounting hole of the second metal member, so that the small-diameter part of the first lamp sleeve is disposed between the first end part and the first metal member and the small-diameter part of the second lamp sleeve is disposed between the second end part and the second metal member.

15. The electrodeless lamp illumination device according to claim 14, wherein the large-diameter part of the first lamp sleeve is disposed outside the mounting hole of the first metal member, and stops the first metal member to prevent the electrodeless lamp from movement and rotation relative to the first metal member, and the large-diameter part of the second lamp sleeve is disposed outside the mounting hole of the second metal member, and stops the second metal member to prevent the electrodeless lamp from movement and rotation relative to the second metal member.

16. The electrodeless lamp illumination device according to claim 15, wherein: when the light-emitting part does not emit light for a predetermined time, a gap is present between the large-diameter part of the first lamp sleeve and the first metal member, and a gap is present between the large-diameter part of the second lamp sleeve and the second metal member.

17. The electrodeless lamp illumination device according to claim 16, wherein: when the light-emitting part continuously emits light for a predetermined time, no gap is present between the large-diameter part of the first lamp sleeve and the first metal member, and no gap is present between the large-diameter part of the second lamp sleeve and the second metal member.

18. The electrodeless lamp illumination device according to claim 13, wherein the light-emitting part receives oscillating microwaves from a magnetron and emits light.

19. The electrodeless lamp illumination device according to claim 13, wherein hardness of the first lamp sleeve and the second lamp sleeve is smaller than hardness of the first end part and the second end part.

20. The electrodeless lamp illumination device according to claim 13, wherein the large-diameter part of the first lamp sleeve and the large-diameter part of the second lamp sleeve are disposed between the small-diameter part of the first lamp sleeve and the small-diameter part of the second lamp sleeve.

* * * * *